(12) United States Patent
Lu et al.

(10) Patent No.: US 11,115,388 B2
(45) Date of Patent: Sep. 7, 2021

(54) SMART BUILDING AGENT FOR BUILDING CONTROL

(71) Applicant: BCE Inc., Verdun (CA)

(72) Inventors: Guang Lu, Thornhill (CA); Shuo Yang, Toronto (CA); Jin Kang, Vaughan (CA); Lik Lai, Verdun (CA)

(73) Assignee: BCE INC., Verdun (CA)

( * ) Notice: Subject to any disclaimer, the term of this patent is extended or adjusted under 35 U.S.C. 154(b) by 146 days.

(21) Appl. No.: 16/228,582

(22) Filed: Dec. 20, 2018

(65) Prior Publication Data

US 2019/0199685 A1 Jun. 27, 2019

Related U.S. Application Data

(60) Provisional application No. 62/609,138, filed on Dec. 21, 2017.

(51) Int. Cl.
*H04L 29/06* (2006.01)
*H04L 12/28* (2006.01)
*G05B 15/02* (2006.01)

(52) U.S. Cl.
CPC ............ *H04L 63/029* (2013.01); *G05B 15/02* (2013.01); *H04L 12/2818* (2013.01); *H04L 12/2825* (2013.01); *H04L 12/2834* (2013.01); *H04L 12/2838* (2013.01)

(58) Field of Classification Search
None
See application file for complete search history.

(56) References Cited

U.S. PATENT DOCUMENTS

| | | | |
|---|---|---|---|
| 8,850,072 B1* | 9/2014 | Roberts | H04L 63/205 709/246 |
| 9,571,582 B2* | 2/2017 | Petite | G08C 17/02 |
| 2005/0119767 A1* | 6/2005 | Kiwimagi | G05B 19/042 700/19 |
| 2007/0232288 A1* | 10/2007 | McFarland | H04L 43/00 455/423 |
| 2013/0201316 A1* | 8/2013 | Binder | H04L 67/12 348/77 |
| 2014/0292535 A1* | 10/2014 | Petite | G01D 4/004 340/870.07 |

\* cited by examiner

*Primary Examiner* — William J. Goodchild (57) ABSTRACT

A processing device such as a server implementing smart building agent functionality is located on an external network and is configured to communicate with a BAS located on a building's internal network. Communication between the processing device and the BAS occurs over a first communications channel. The processing device can be configured to receive sensor data from various sensors that might otherwise not be supported by the existing BAS. Communication between the sensors and the processing device occurs over a second communications channel different from the first communications channel. The processing device can generate control commands based on the received sensor data that provide instructions to the BAS for adjusting an operation parameter for one or more of the building systems and/or equipment. This control command can be sent to the BAS through the first communications channel.

20 Claims, 6 Drawing Sheets

SMART BUILDING AGENT FOR BUILDING CONTROL

TECHNICAL FIELD

The present disclosure relates to systems and methods for controlling building systems and/or equipment, and in particular to systems and methods for securely enhancing the functionality of building automation systems.

BACKGROUND

A Building automation system (BAS) is an automatic or semi-automatic centralized control system for a building that allows building owners to have more control over the heating, ventilation and air conditioning (HVAC), lighting, and other systems and/or equipment in the building. A typical BAS has limited computing resources which can limit security of the system as well as third party platform support. For network security purposes, the BAS is typically deployed in a local network associated with the building and is not allowed to interface with other platforms or services outside of the network. Even if a BAS were designed with greater capacity, the BAS could not interface with external platforms or service modules without compromising network security.

A BAS comprises basic hardware components and is designed with low computing capacity and minimum storage on the device. Most of the connections between the BAS and building equipment are hard-wired, and as one example of BAS limitations, integration of smart sensors in the building with the BAS is a difficult and extensive task because a legacy BAS is not designed for wireless communication. Accordingly, current BASs cannot support enhanced features and have limited ability to perform complex management and/or control of building systems and equipment due to issues such as limited computing capacity, security, proprietary protocols, limited eco-systems, etc.

Accordingly, systems and methods that provide additional, alternative, and/or improved control of building systems and/or equipment remains highly desirable.

SUMMARY

In accordance with the present disclosure there is provided a system, comprising: a Building Automation System (BAS) located within a building, the BAS communicatively coupled to a communication network and configured to control building systems and/or equipment; one or more environmental sensors associated with the building and separate from the BAS; and a processing device located remote from the BAS and communicatively coupled to the BAS and the one or more environmental sensors, the processing device configured to communicate with the BAS over a first communications channel, and configured to communicate with the one or more sensors over at least one second communications channel for receiving sensor data.

In a further embodiment, the system further comprises a network firewall for the building, wherein the BAS is located on an internal network side of the network firewall and the processing device is located on an external network side of the network firewall, and wherein the BAS and processing device communicate over a secure channel passing through the network firewall.

In a further embodiment of the system, communication between the one or more environmental sensors and the processing device over the at least one second communications channel passes through the network firewall for the building.

In a further embodiment of the system, at least one of the one or more environmental sensors send respective sensor data to a sensor hub associated with the building, and the sensor hub sends the sensor data as an aggregation of the respective sensor data to the processing device.

In a further embodiment of the system, the at least one of the one or more environmental sensors send the sensor data to the sensor hub via a wired or wireless connection.

In a further embodiment of the system, the wired or wireless connection includes at least a portion of the communication network.

In a further embodiment of the system, the sensor hub sends the sensor data to the processing device over a cellular network or an IP network.

In a further embodiment of the system, at least one of the one or more environmental sensors is configured to communicate over a cellular network, and wherein the at least one second communications channel includes a portion of the cellular network.

In a further embodiment of the system, the processing device is further configured to generate a control command based on the sensor data received over the at least one second communication channel, the control command providing instructions for the BAS to adjust an operation parameter for one or more of the building systems and/or equipment, and wherein the control command is sent to the BAS over the first communications channel.

In a further embodiment of the system, the BAS is further configured to receive building operation data from the building systems and/or equipment, and to send the building operation data through the firewall for the building to the processing device.

In a further embodiment of the system, the control command is generated further based on the building operation data.

In a further embodiment of the system, the building systems and/or equipment are hard-wired to the BAS.

In a further embodiment of the system, the processing device is further configured to communicate with one or more external data sources.

In a further embodiment of the system, the communication between the BAS and the processing device over the first communications channel is in accordance with BAS protocols comprising one or more of: BACnet, Modbus, Haystack, oBix, Sedona, and LonWorks.

In a further embodiment of the system, the processing device is located in the building.

In a further embodiment of the system, the processing device is located in a cloud-based system.

In a further embodiment of the system, the processing device is configured to communicate with a plurality of BASs.

In accordance with the present disclosure there is provided a method, comprising: establishing a connection with a Building Automation System (BAS) over a first communications channel, the BAS located within a building and configured to control building systems and/or equipment; receiving, at a processing device remote from the BAS, sensor data from one or more environmental sensors over at least one second communications channel, the one or more environmental sensors associated with the building and separate from the BAS; generating, at the processing device, a control command based on the sensor data received over the at least one second communications channel, the control command providing instructions for the BAS to adjust an operation parameter for one or more of the building systems and/or equipment; and sending, over the first communications channel, the control command to the BAS.

In a further embodiment, the method further comprises receiving, from the BAS over the first communications channel, building operation data from the building systems and/or equipment, and wherein the control command is generated further based on the building operation data.

In a further embodiment of the method, the control command is generated by applying pre-defined rules to the received building operation data and sensor data.

In a further embodiment, the method further comprises receiving at the processing device, from an external data source, additional data pertaining to the building; generating a new rule to apply to the building operation data and sensor data based on the additional data; and generating the control command by applying the new rule to the building data and the sensor data.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The present disclosure describes systems and methods for controlling building systems and/or equipment, and may be used to enhance functionality of a building's legacy BAS without compromising security of the building's network, systems, and/or equipment.

A processing device such as a server implementing smart building agent functionality is located on an external network and is configured to communicate with the BAS located on a building's internal network. Communication between the processing device and the BAS occurs over a first communications channel. The processing device has greater computing capacity and functionality than the BAS. Additionally, the processing device is configured to communicate over various networks and supports several different types of communication, and is thus not limited to a physical or hard-wired connection that the BAS is typically restricted to when communicating with the systems and/or equipment of the building.

With this arrangement, the processing device can be configured to receive sensor data from various sensors (such as wireless sensor data from smart sensors) that could not be supported by the existing BAS. Communication between the sensors and the processing device occurs over one or more communications channels different from the first communications channel. The processing device can generate control commands based on the received sensor data that provide instructions to the BAS for adjusting an operation parameter for one or more of the building systems and/or equipment. This control command can be sent to the BAS through the first communication channel.

Additionally, the BAS may collect/receive building operation data from the various building systems and/or equipment, and send the building operation data to the processing device. The processing device can analyze this building operation data, including analyzing the building operation data in conjunction with the sensor data. In some instances the processing device may also communicate with one or more external data sources over the external network for additional or secondary data that may pertain to the building. The processing device may use the building operation data and the additional data for generating the control commands.

In this manner, the capabilities of the BAS can be greatly enhanced by the processing device without requiring significant modifications or upgrades to the existing or legacy BAS. Additionally, the BAS only has a single external point of communication (with the processing device), and accordingly the risk of compromised building security is reduced as compared to attempting to configure the BAS to communicate with several external devices and/or data sources.

Embodiments are described below, by way of example only, with reference to FIGS. 1-6.

Figure 1:
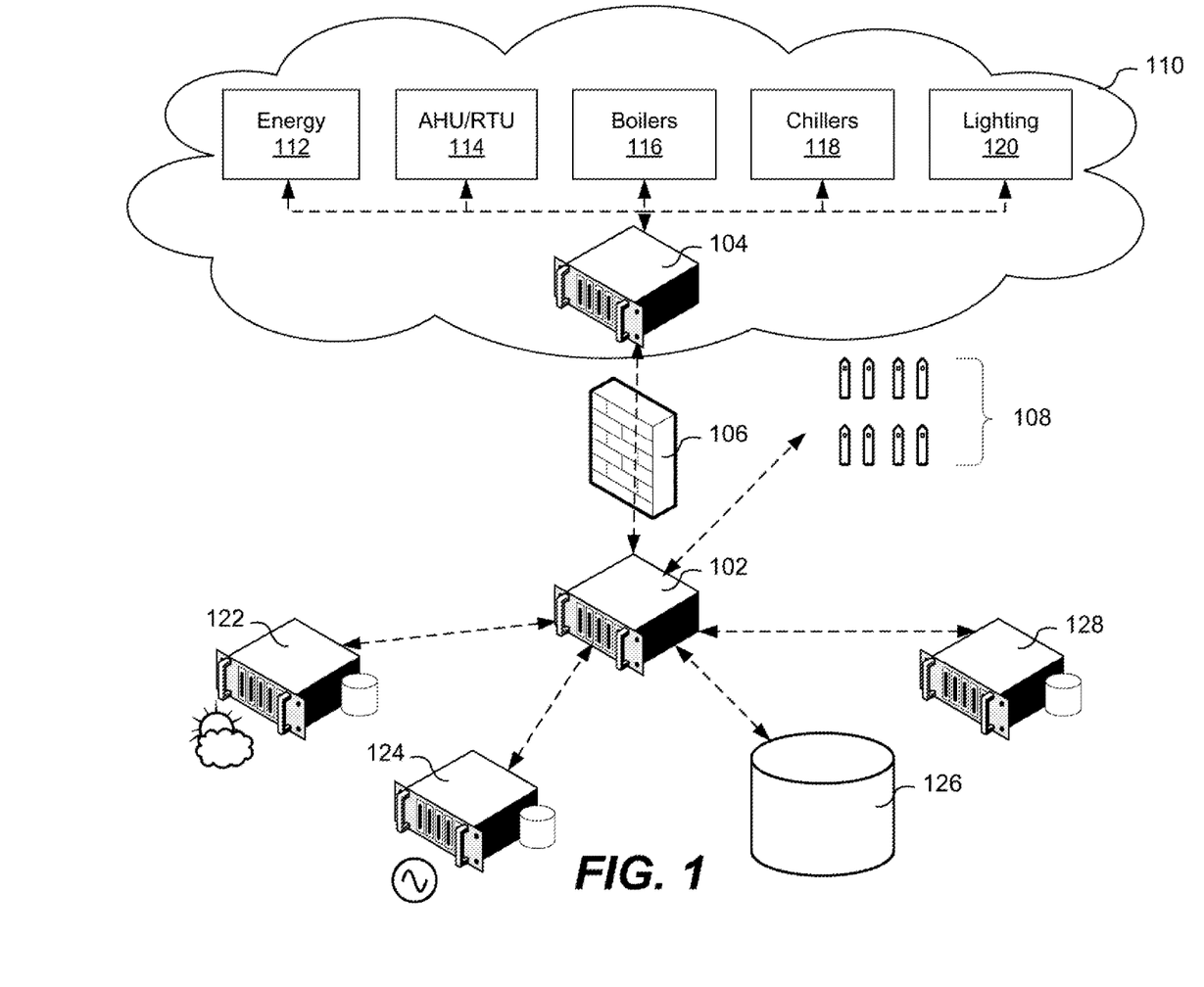
FIG. 1 is a representation of network architecture for a building control system in accordance with some embodiments.

FIG. 1 is a representation of network architecture for a building control system in accordance with some embodiments. As depicted in FIG. 1, a processing device implementing smart building agent functionality (depicted as server 102) communicates with BAS 104 through a firewall 106 of the building. Communication between the BAS 104 and the server 102 occurs over a first communications channel, and may, for example, occur over an IP network as part of a local area network. The firewall 106 may not necessarily be implemented as a physical firewall, but instead may also be a virtual firewall, for example. The firewall 106 only needs to allow data between the BAS 104 and the server 102, and as such can provide a highly secure internal network for the building. The BAS 104 is located behind the firewall 106 on the internal network 110 associated with the building, and the server 102 is located outside of the firewall 106 on an external network. The BAS is generally located physically within the building. The server 102 may be located physically inside the building (but on an external network), outside of the building, and/or be implemented as part of a cloud-based system.

The BAS 104 controls and interacts with various systems and/or equipment in a building through the internal network 110, which typically comprises hard-wired connections. The building equipment controlled by the BAS 104 may include any equipment associated with the building, and FIG. 1 depicts the BAS 104 in communication with energy monitoring equipment 112, air handling units (AHUs)/rooftop units (RTUs) 114, boilers 116, chillers 118, and lighting systems 120 as example systems and/or equipment. For example, the BAS 104 may control all lights and lighting equipment for a building by treating all of the individual equipment as a system, or the BAS 104 may communicate with specific lighting equipment such as a specific light in a particular room of the building. Hence, building systems and/or equipment is used to refer to both collections of building equipment as well as the respective building equipment themselves. A person skilled in the art will also appreciate that the BAS 104 may control and communicate with additional and/or different building systems and/or equipment than what is referred to herein.

The BAS 104 may monitor the building systems and/or equipment and collect building operation data therefrom through push and/or pull mechanisms. The BAS 104 may also send operation commands and/or receive equipment statuses. For example, the BAS 104 may monitor data such as uninterrupted power supply data from equipment using an SNMP trap. The BAS 104 may also collect equipment and/or sensor data from TCP ports. As an example, the BAS 104 may receive data regarding air temperature, humidity, and/or occupancy, which may be broken down further by specific zones within the building. The building equipment may comprise network cards to communicate and send/receive signals to/from the BAS 104 using an IP address, for example.

Based on the building data the BAS 104 can adjust operation parameters for controlling the building systems and equipment accordingly. Operation parameters may include, for example, heating and cooling setpoints, etc. However, as previously described, the BAS 104 is designed with simple computational and storage capacity and has limited functionality. Additionally, a legacy BAS can typically only support hard-wired connections to the building systems and/or equipment, and thus cannot support wireless communication that is common for smart sensors.

However, by providing the server 102 interfacing with the BAS 104, the functionality of the BAS 104 can be greatly enhanced, as described in more detail below. The server 102 is designed with greater computing and storage capacity, as well as support for wireless communication. The server 102 may integrate with different verticals and may also have built-in AI functionality to collect information from verticals and generate insights for improving energy efficiency for the building, responding to building system/equipment issues, etc. The server 102 thus enhances the capabilities of the BAS 104, which is not designed with the capacity to support interaction with other services and platforms itself, notwithstanding security issues. By integrating the BAS 104 with the server 102, a single point of communication exists on the external network for the BAS 104, which is advantageous for providing just a single input to the BAS representing an aggregate of information received from building sensors and external data sources, as well as maintaining network security.

Figure 2:
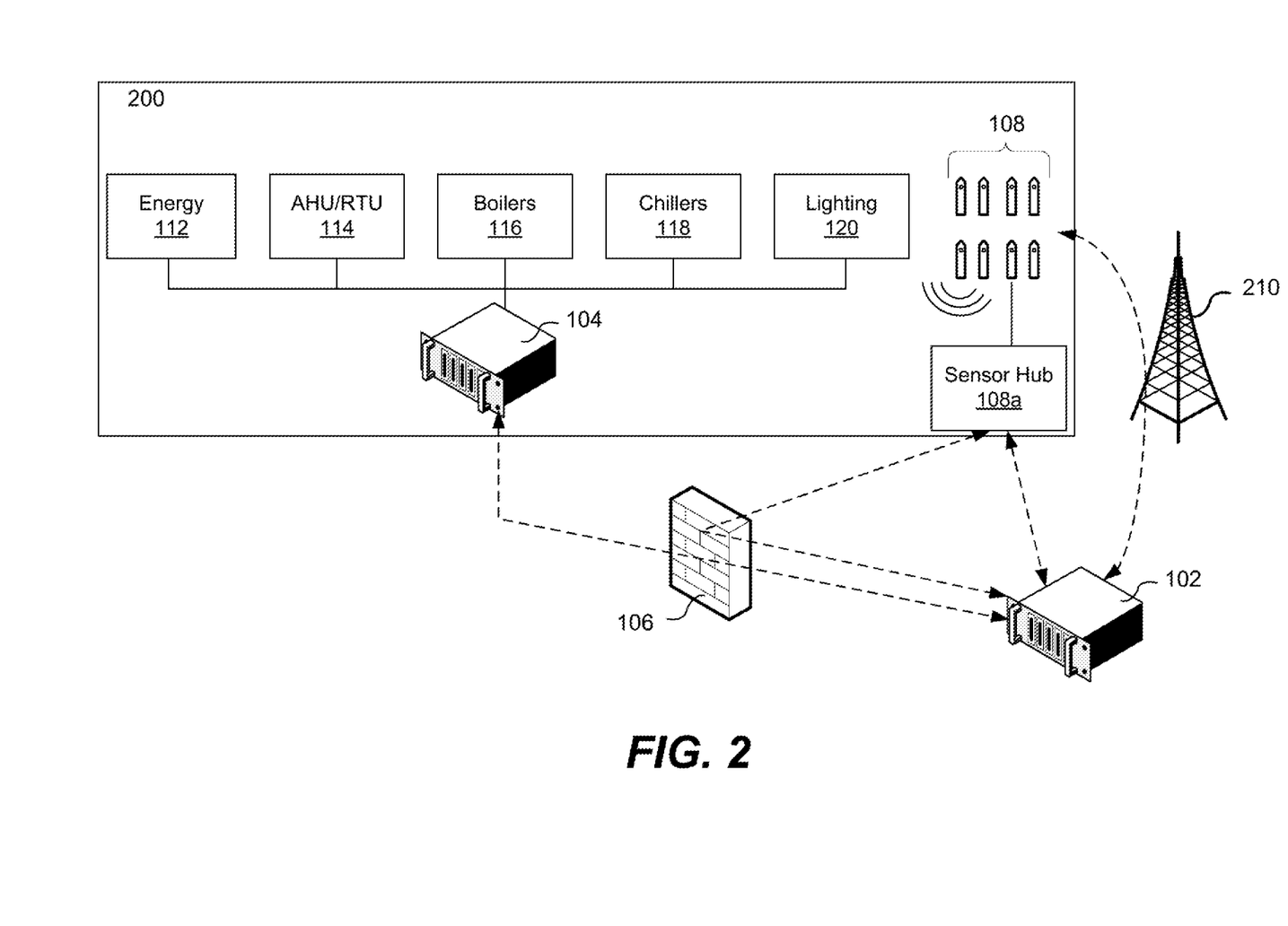
FIG. 2 is a representation of a physical architecture for the building control system in accordance with some embodiments.

FIG. 2 is a representation of a physical architecture for the building control system in accordance with some embodiments. With concurrent reference to FIG. 1 and FIG. 2, the server 102 is configured to communicate with one or more sensors 108 that are associated with the building, but are not integrated with or communicate with the BAS 104. Communication between the sensors 108 and the server 102 occurs over one or more second communications channels that are different than the first communications channel. The server 102 may send data requests to the one or more sensors 108, and receive the sensor data over the respective second communications channel.

The one or more sensors 108 associated with building 200 may include, but are not limited to: an accelerometer, gyroscope, magnetometer, humidity sensor, pressure sensor, temperature sensor, acoustic sensor, digital light sensor, etc. The sensors 108 can be easily deployed in the building for monitoring comfort of specific building zones, etc. The sensors 108 may for example send sensor data and communicate with the server 102 over an IP network or a cellular network (represented by cellular tower 210). In the case of communicating over the cellular network, a sensor may comprise a SIM card. In some instances, the building 200 may have a sensor hub 108a, which can receive sensor data from individual sensors (e.g. wired or wirelessly) and communicate the respective sensor data to the server 102 over an IP network or cellular network, for example. In this instance, a portion of the second communications channel may include a part of the building's internal network (for example a building's LAN for wired communication, or Wi-Fi™ or Bluetooth™ for wireless communication). The server 102 and sensors 108 may also support other communication protocols, such as MQTT™ or ZigBee™. In some instances, the communication between the sensors 108 and the server 102 may also pass through the building's firewall 106.

The server 102 may store the received sensor data for analysis. Additionally, based on the received sensor data the server 102 can generate a control command that instructs the BAS 104 to adjust an operation parameter for one or more of the building systems and/or equipment. The control command can be generated using smart agent functionality being implemented by the processing device of the server, and may vary in complexity and functionality depending on the building systems and/or equipment being controlled by the BAS 104 as well as the data that is collected by the one or more sensors 108. As a non-limiting example, the received sensor data may indicate that an occupant just entered or is approaching a floor of the building, and the server 102 may generate a control command instructing the BAS 104 to ensure that a corresponding light on that floor is turned on. As a further example, the received sensor data may indicate a relative humidity of outside air at 75%, and the server 102 may generate a control command to adjust an operating parameter of the building's HVAC system, such as operating parameters of the building's AHU and/or RTU. The server 102 may generate the control command using a set of rules that are applied to the sensor data. The rules may be pre-defined and/or continuously developing, as will be described in more detail below.

The server 102 can securely send the control commands to the BAS 104 over the first communications channel through the firewall 106. Additionally, the BAS 104 can collect and receive building operation data for the building systems and/or equipment and send the building operation data to the server over the first communications channel for analytics, storage, reporting, etc. The server 102 comprises a communication interface that supports BAS communication standards. Control commands, building operation data, etc., may be sent between the server 102 and the BAS 104 via standard BAS protocols such as BACnet, Modbus, Haystack, oBix, Sedona, or LonWorks, or device-to-device analog or binary signal.

Referring back to FIG. 1, the BAS 104 only communicates with the server 102 outside of the internal network 110. The server 102 may in turn communicate with one or more external data sources to further enhance the building control functionality. In this manner, the BAS itself does not have to communicate with external data sources itself, which is otherwise not feasible due to computing restraints as well as the increased risk of the internal network 110 being compromised.

The server 102 comprises an interface for communicating with various external data sources, such as building eco-systems and/or third party platforms/systems. The building eco-systems may for example comprise systems/equipment that are associated with the building and/or are provided by the building management. The third party platforms/systems may comprise various types of hardware and/or software that are provided by a third party. The server 102 is configured to communicate with the external data sources in accordance with all relevant protocols of the external data sources.

Non-limiting examples of the external data sources that the server 102 may communicate with may include a weather server 122, billing system 124, data resources and analytics services (depicted in FIG. 1 as a big data platform 126), and other platforms 128 such as social media platforms.

The weather sever 122 may be provided by a third party. For example, the server 102 may be able to query the weather service 122 and receive weather data (e.g. temp/humidity, heating degree day, cooling degree day) in response from the weather server 122.

The server 102 may also communicate with billing system 124. For example, the server 102 may sync with the billing system 124 and exchange data such as consumption targets and results. The data exchanged between the server 102 and the billing system 124 may be specific to electricity, gas, water, etc., usage, and/or usage increase or decrease.

In another example, the server 102 may link to various data resources and analytics services, depicted in FIG. 1 as a big data platform 126, for storing, analyzing, and querying of data. Advantageous features that may be provided through access and analysis of stored data will be further described herein.

The server 102 may also communicate with other platforms 128, including but not limited to social networks, to further enhance capacity of the BAS 104 by making functional requests and receiving responses from the other platforms 128. As a non-limiting example, the server 102 may use social networks to send updates to building occupants, such as heating/cooling/lighting schedule changes, heating/cooling/fresh air setpoint increases or decreases, etc. The server 102 may also receive notifications or alerts through social media.

There are a number of possible interactions and uses of data sent between the server 102 and external data sources such as the weather server 122, billing systems 124, big data platform 126, and other platforms 128. While several example interactions between the server 102 and these external data sources are provided herein, a person skilled in the art will readily appreciate that other interactions and uses of the disclosed system are possible and can be readily implemented without departing from the scope of this disclosure.

Further, although FIG. 1 depicts the server 102 only integrating with a single BAS 104, the server 102 can integrate with several BASs. In some embodiments, the server 102 may be able to use building operation data received from one BAS to generate control commands for another BAS. As a non-limiting example, the server 102 may receive a large amount of data from one BAS that is indicative of how the systems and/or equipment of that building operate under certain conditions (e.g. certain weather conditions). The server 102 may use the received building data to generate control commands not only for the building systems and/or equipment from which the building operation data was retrieved from, but also for another BAS that may control similar systems and/or equipment under similar operating conditions. As another non-limiting example, the server 102 may receive building operation data from one building indicative of a fire. The server 102 may then be able to notify the BASs of nearby buildings that are in communication with the server 102 of the fire, which may in turn prompt fire alarms and/or calls for evacuation of the nearby buildings.

Figure 3:
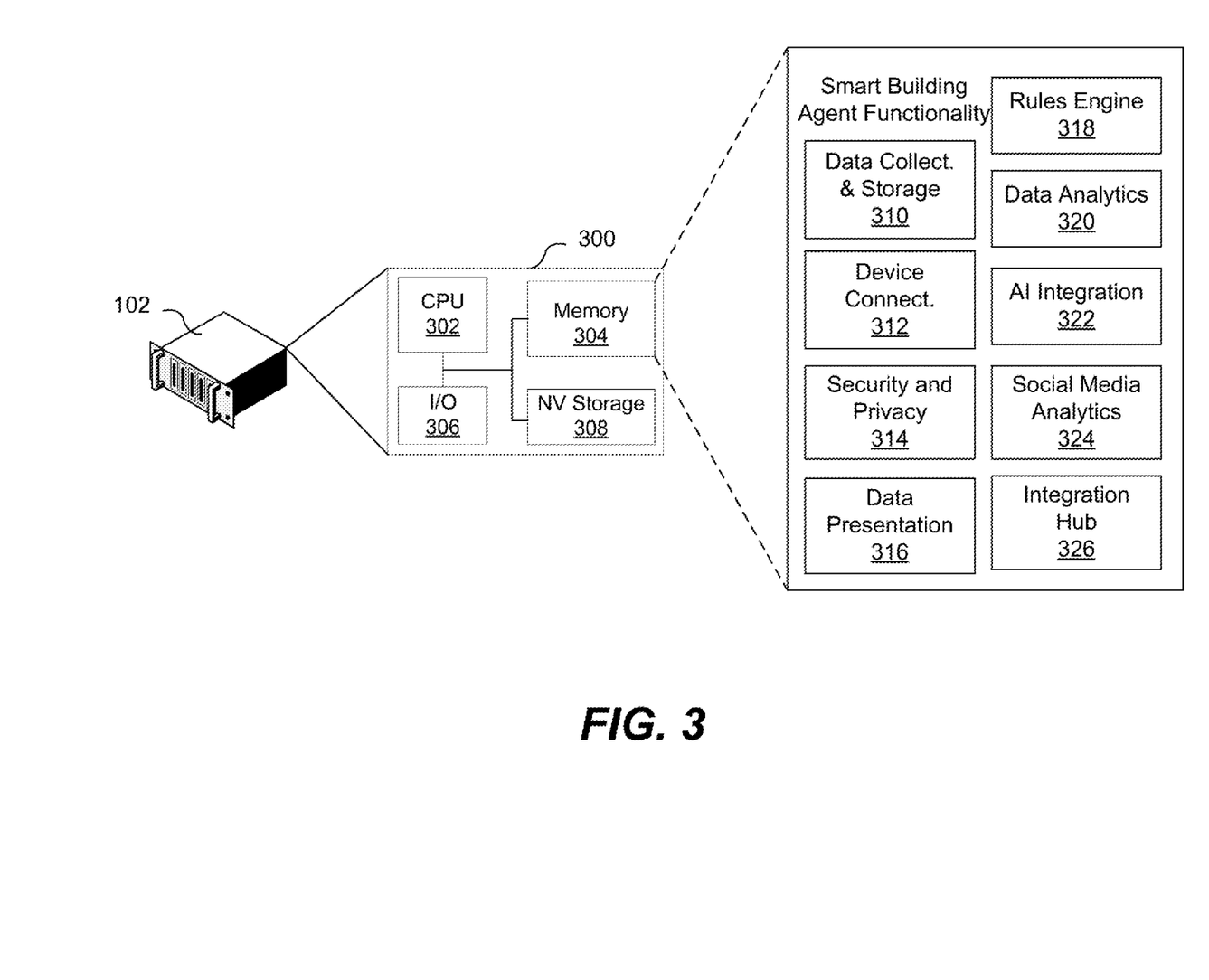
FIG. 3 is a representation of a server configured to implement smart building agent functionality.

FIG. 3 is a representation of a server configured to implement smart building agent functionality. The server 102 comprises physical components 300. The physical components 300 comprise a processing device (CPU 302), which has greater processing capacity than that of the BAS 104, and a memory 304 that comprises non-transitory computer-readable instructions that are executable by the CPU 302. In particular, the instructions stored in memory 304 provide smart building agent functionality that can be implemented by the processing device of server 102. In this manner, the server 102 and specifically the CPU 302 can be configured to perform various functionality such as receiving sensor data, generating control commands, receiving building operation data, communicating with external data sources, etc., as described herein.

The physical components 300 of the server 102 may further comprise an I/O interface 306 operatively coupled to the processor, which provides an interface for receiving data/requests (e.g. from the BAS 104, sensors 108, and/or external data sources), sending control commands and queries/outputs (e.g. to the BAS 104, to the sensors 108, and/or external data sources). The I/O interface 306 may comprise a communication interface for communicating with the BAS 104, the sensors 108, and external data sources over the various communication networks and in accordance with the relevant protocols. The I/O interface 306 may also provide for a user interface for a user/manager of the server 102, which may be used to configure the smart building agent functionality within the server 102, as well as provide a dashboard and/or a screen or other user interface to display/output/present certain data, geographic information, system information, analytics reports, etc.). The server 102 may also comprise non-volatile storage 308, for the permanent or semi-permanent storage of instructions and data. For example, the sensor data, building operation data, etc., may be stored in the non-volatile storage 308.

As depicted in FIG. 3 the smart building agent functionality may comprise various modules for configuring the processing device of server 102 with corresponding functionality. These modules can be interoperable with one another, and are described below.

The data collection and storage module 310 may comprise instructions that configure how the processing device collects data (e.g., from the BAS 104, sensors 108, etc.), filters data, and stores data (e.g., in storage, by interfacing with the big data platform 126, etc.).

The device connection module 312 may comprise instructions that configure how the processing device connects with external devices (e.g., connection between the server 102 and the sensors 108, and the protocols dictating such communication). The instructions in the device connection module 312 may be specific for connecting with respective devices (e.g. different instructions for the server 102 to integrate with the BAS 104 than sensors 108, different for respective sensors depending on the type of sensor). The device connection module 312 may configure the I/O interface 306 to facilitate communication with the BAS 104, the sensors 108, and external data sources.

The security and privacy module 314 may comprise instructions and/or software for maintaining the security of the server 102 as well as the BAS 102 and building network 110. For example, the security and privacy module 314 may comprise instructions for maintaining security of the server 102 and identify any potentially dangerous connections. The security and privacy module 314 may also comprise security software to prevent the server 102 from being attacked. The security and privacy module 314 may still further comprise instructions for communicating with the BAS 104 through the firewall 106.

The data presentation module 316 may comprise instructions for presenting data obtained and/or analyzed by the server 102 (e.g., analytics reports, etc.) that may be presented by the server 102 (e.g. through a UI) or sent externally (e.g. to the billing system).

The smart building agent functionality stored in memory 304 may further comprise instructions that provide a rules engine 318. The rules engine 318 may comprise rules for which to perform filtering/analysis of received data, as well as rules guiding control commands to be sent to the BAS, etc. The rules engine 318 may initially be configured by building management. The rules engine 318 may also allow for the generation of new rules and/or updating/modification of existing rules based on received data.

The smart building agent functionality stored in memory 304 may also comprise a data analytics module 320 containing instructions for analyzing data and that can trigger action/outputs to the BAS 104 based on rules in the rules engine 318. The data analytics module 320 may also be able to identify some potential issues which were not sufficient to trigger an action or control command by the server 102 to the BAS 104, but may still have resulted in more consumption of the building's energy. Information from the data analytics module 320 may also be used in the previously mentioned generation of new rules by the rule engine 318.

Among other things, the data analytics module 320 may help to provide equipment/sensor health status, for example by using the rule engine 318 to identify faulty equipment. The data analytics module 320 may further help to recommend a heating/cooling/lighting schedule change, and/or a heating/cooling/fresh air setpoint increase or decrease, for example. The data analytics module 320 may also comprise specific instructions on how to filter the received data so that appropriate rules can be applied. As an example, the rules engine 318 may define that any temperature sensor which does not record a different temperature measurement over a 24-hour period is deemed faulty, because it is likely that a room/zone of the building would experience small temperature fluctuations. The data analytics module 320 may filter all received data to obtain just the data related to temperature sensors over a period of 24-hours, and analyze the temperature sensor data in accordance with said rule to determine if any of the temperature sensors are faulty.

Information from the data analytics module 320 may also be used to produce analytics reports, which may be presented in accordance with the data presentation module and displayed in a UI to building management. The analytics report can identify any problem areas quickly and efficiently, which allows issues to be addressed quickly. The data analytics module 320 provides more accurate input to the BAS 104 to adjust building operation parameters based on demand and schedule which results in desired operation and energy saving. In some instances, an analytics report may be produced on a regular basis to provide building management with a clear understanding on the consumption of the energy. The data analytics module 320 may also be used to present operators of an issue with a clear, understandable display showing when and where the issues have been found.

For example, some areas or zones of a building may need more electricity to cool the air than other areas or zones. By running the temperature differential between the mixed air and return air sensors through an algorithm in accordance with the rules engine 318, the data analytics module 320 may identify that outside air is being brought in during a period of high humidity and inform operators with a concise report organized by building, system name, etc. The same analytics rule can identify this condition across an entire portfolio of buildings or systems. The data analytics module 320 also allows for quickly identifying errant equipment operation due to malfunctioning components, which will result in improved energy performance.

The smart building agent functionality stored in memory 304 may further comprise an AI integration module 322. The AI integration module 322 may comprise instructions that enhance the capabilities of other modules and functionality of the server 102 by incorporating artificial intelligence.

The smart building agent functionality stored in memory 304 may further comprise a social media analytics module 324. The social media analytics module 324 may comprise instructions and stored information for connecting the server 102 to popular social media mechanisms e.g. Twitter™, Facebook™, Instagram™ etc. The social media analytics module 324 may be used to identify posts from users directed at the building. For example, building occupants may report their status/building condition such as "too hot" or "too cold". Upon receiving the information, the processing device may analyze building data, for example using data analytics module 320, and generate a new rule and/or inform the BAS 104 to adjust building conditions accordingly to improve the occupant experience and also the efficiency of the building energy usage.

The social media analytics module 324 may be used to post building updates, such as alerts for any problematic area and update status to the end users through the various social media platforms. The alert may specify the potential problem area and provide any additional detail on the nature of the problem when prompted, as well as the option to request assistance. Furthermore, the sever 102 can provide the energy analytics data to the end users through social media platforms, thereby allowing the building occupants to understand what the energy consumption in the building is.

The smart building agent functionality stored in memory 304 may also comprise an integration hub 326. The integration hub 326 may comprise instructions for configuring the server 102 to integrate with the BAS 104 and sensors 108 as well as external data sources. The integration hub 326 may comprise instructions including BAS communication protocols for the server 102 to integrate with the BAS 104

The smart building agent functionality as described with reference to FIG. 3 are for explanatory purposes and are not limited to such. The server 102 may store in memory additional instructions providing software features/modules not described above, as would be appreciated by a person skilled in the art and which could be implemented without departing from the scope of this disclosure.

Figure 4:
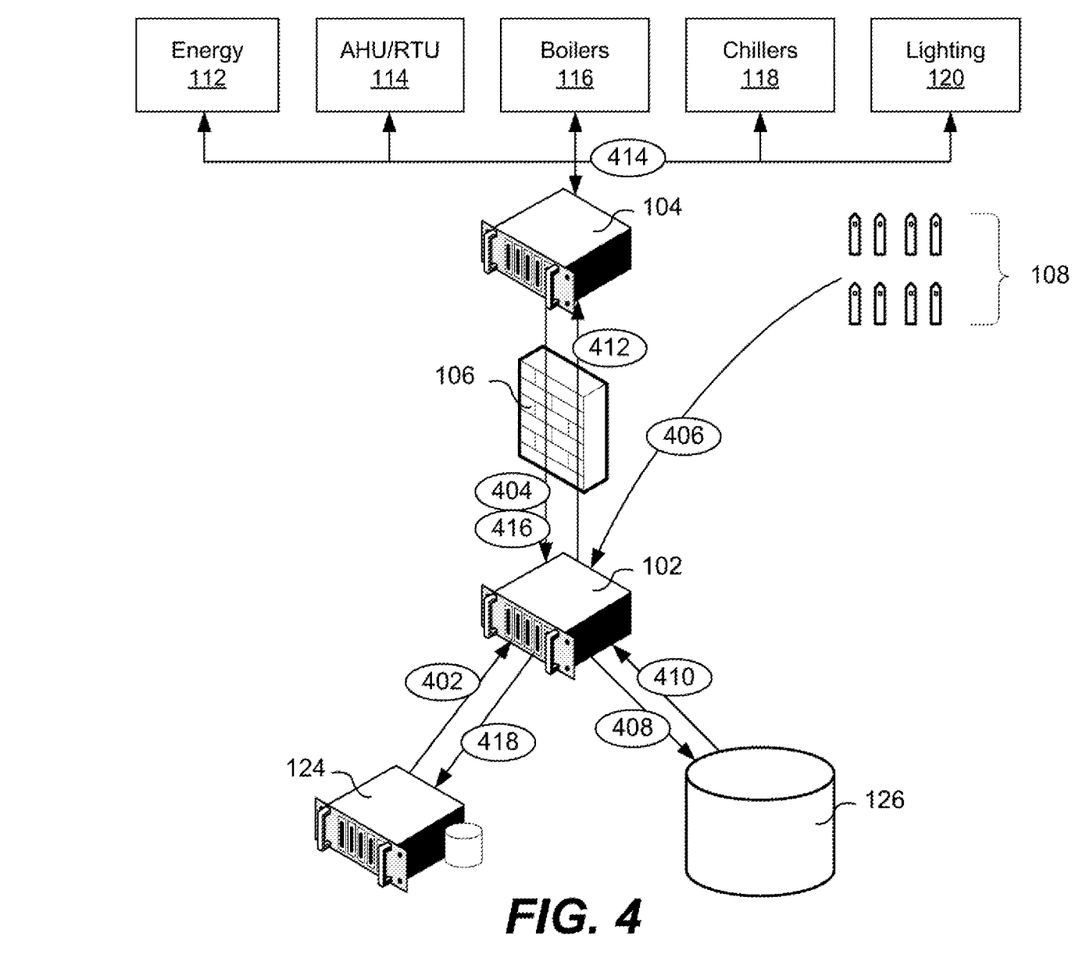
FIG. 4 depicts an example process flow diagram in accordance with some embodiments.

FIG. 4 depicts an example process flow diagram in accordance with some embodiments. Certain elements have been omitted from FIG. 4 for clarity of the process flow diagram.

In the example depicted in FIG. 4, the billing system 124 pushes a request containing a budget target to the server 102 implementing the smart building agent functionality (402). For example, the budget target may be to reduce this month's electricity usage by 3% compared to the same month last year. The budget may be stored in the rule engine module 318 within the memory 304 of the server 102. Building operation data is received at the server 102 from the BAS 104 over a first communications channel (404). The server 102 may request building data from the BAS 104 in response to receiving the request from the billing system 124, or the server 102 may use previously received building data from the BAS 104 in response to the request. The building data can be obtained from the BAS 104 by using the data collection and storage module 310 of the server 102, for example. Additionally, sensor data is received at the server 102 from one or more sensors 108 over one or more second communications channels (406). The sensor data may be received in real-time or at predetermined intervals. In some instances the server 102 may send a data request for the sensor data.

Some straightforward statistics may be generated either by BAS 104, or the data analytics module 320 in the server 102. For example, the server 102 may determine the electricity usage for the current month, and retrieve the electricity usage data for the same month of the previous year for comparison. The server 102 may also send the sensor data and building operation data as well as rules (e.g. the budget target) to the big data platform 126 for more complex data analysis (408). As previously described, the big data platform 126 is a specialized external platform that may provide intelligence and capacity to perform in-depth of analysis beyond that of the server 102.

For example, when the server 102 compares the monthly electricity usage it may find that it does not meet the budget target of 3% lower. The server 102 may generate a control command for adjusting an operation parameter the building systems and/or equipment to meet this constraint. Additionally or alternatively, as is shown in FIG. 4, the server 102 may also send the sensor data and building operation data along with the budget target to the big data platform 126. The building operation data may contain the monthly electricity usage, daily electricity usage, the location of the building, etc. The sensor data may comprise occupancy data that might be useful to compare against the building operation data. The big data platform 126 and the server 102 may exchange messages so the big data platform 126 can obtain the data needed for analysis. For example, the big data platform 126 may use a combination of historical data, such as local weather data, building occupancy, and lighting, to analyze the possible cause of high electricity usage.

The big data platform 126 may generate new rules/actions to reduce electricity usage, which are sent to the server 102 (410). For example, the new rules may comprise rules for optimizing the lighting schedule of the building in order to achieve the target of electricity usage. The server 102 can apply the new rules to the building operation data and the sensor data to generate a control command, and sends the control command to the BAS 104 (412), which provides instructions to adjust an operation parameter for one or more of the building systems and/or equipment. For example, if a change to the control of the current light schedule is required in order to comply with the new rules, the server 102 generates and sends a control command to the BAS 104 indicating the updated light schedule. The BAS 104 executes the instructions received from the server 102 (414) by controlling the operation parameters of the building systems and/or equipment in accordance with the control command.

The BAS further collects new building operation data from the building systems and/or equipment and sends the data to the server 102 (416). The server 102 may analyze the building operation data and generate an analytics report comprising the electricity usage consumption result. The server 102 may provide the results to the billing system 124 (418).

Figure 5:
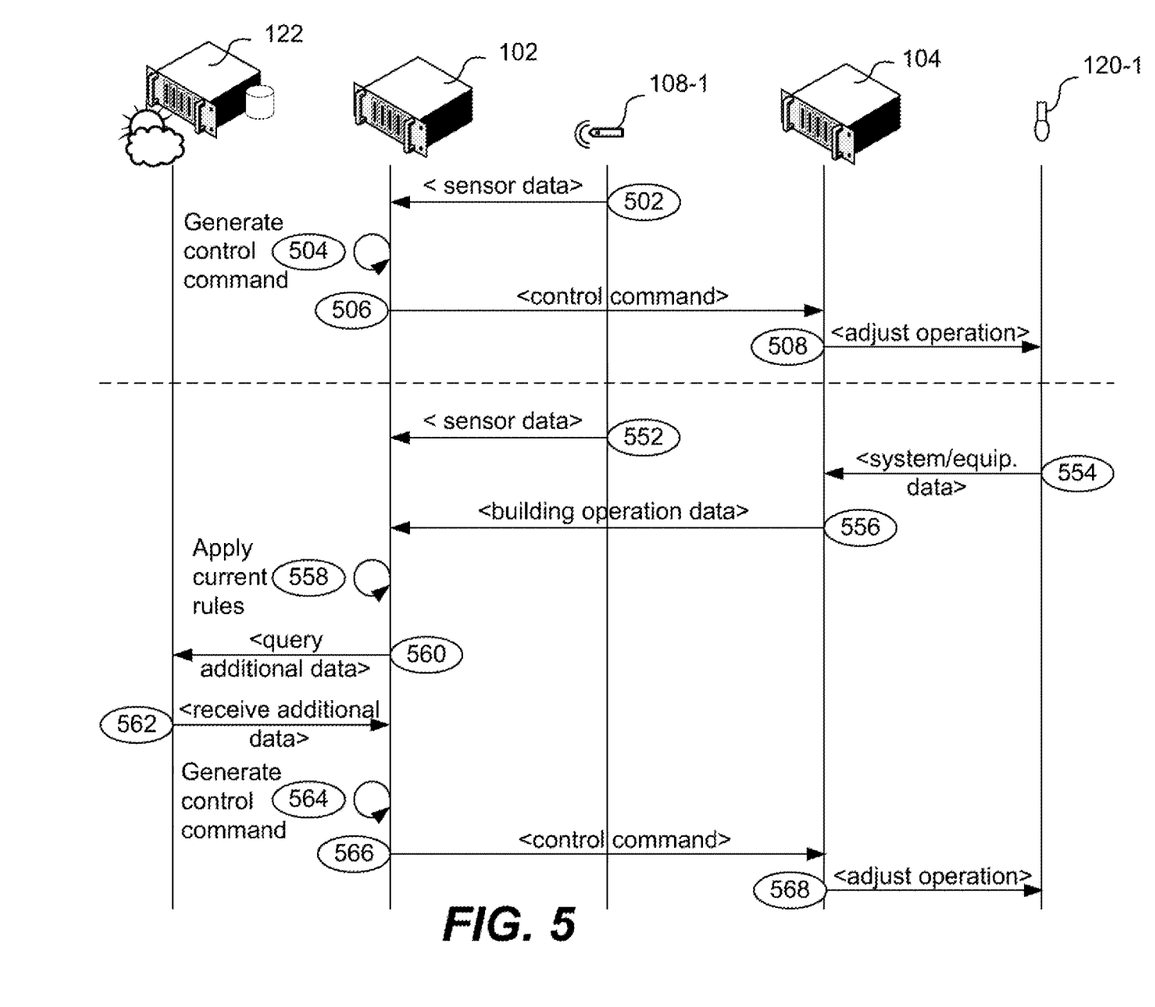
FIG. 5 shows a communication flow diagram in accordance with some embodiments.

FIG. 5 shows a communication flow diagram in accordance with some embodiments. As previously described, the BAS 104 and the building systems and/or equipment (depicted in FIG. 5 as a light bulb 120-1 corresponding to lighting system 120) are located on an internal network behind a firewall. The sensors (depicted in FIG. 5 as sensor 108-1) may or may not be located on the internal network, and its communication may or may not pass through the firewall. The server 102 and external data source (depicted in FIG. 5 as the weather server 122) are located on an external network.

In the communication flow diagram shown in FIG. 5, the server 102 receives sensor data from one or more sensors (502). The sensor data is received over a second communications channel that is different than a communications channel between the server 102 and BAS 104. The server 102 processes the sensor data and generates a control command (504). The control command may be generated by applying rules to the received sensor data. The control command provides instructions for the BAS 104 to adjust an operation parameter for one or more of the building systems and/or equipment. The control command may not necessarily provide instructions to adjust an operation parameter for the particular building systems/equipment from which the data was received from. For example, data from occupancy sensors may indicate that occupancy of the building substantially decreases on Fridays at 5 pm, as compared to other days of the week at 5 pm. Accordingly, the control command may instruct the BAS 104 to adjust the lighting schedule so that more lights are automatically turned off on Fridays at 5 pm.

The server 102 sends the control command to the BAS over a first communications network (506). The BAS 104 adjusts an operation parameter of the building systems and/or equipment in accordance with the control command (508), such as by updating a lighting schedule for the lighting system 120, or updating a lighting schedule for certain lighting equipment of the lighting system 120 such as light bulb 120-1, with which the operation of the lighting system 120 and/or light bulb 120-1 are controlled in accordance with.

In another example, the server 102 further utilizes building operation data for generating the control command. Additionally, the server 102 can leverage secondary building data/additional data pertaining to the building from external data sources, such as the weather server 122.

The server 102 receives sensor data from one or more sensors over the second communications channel (552). The BAS 104 receives data from the building systems and/or equipment (554). The BAS 104 securely sends the building operation data to the server 102 over the first communications channel (556). In this example, the server 102 may apply rules from the rule engine on the received sensor data and building operation data (558), and determine that additional information is required in order to evaluate the building data against the rules. The server 102 may also assess (through the AI integration module, for example) that the existing rules are not sufficient for achieving the desired building efficiencies.

The server 102 may query an external data source for additional building information (560), such as querying the weather server 122 to receive additional weather information at the location of the building. The server 102 receives the response from the external data source (562), and analyzes the additional/secondary building information along with the received sensor data and building operation data. This allows for the server 102 to analyze more complex rules (for example, how is the temperature of the building being controlled in relation to relative humidity outside of the building). This may also allow the server 102 to generate new rules.

The server 102 generates a control command, or an updated control command (564), providing instructions for the BAS to adjust an operation parameter for one or more of the building systems and/or equipment. The control command may be generated based on the more advanced analytics offered by receiving the secondary building information. The control command may be generated based on a new rule developed in light of the building operation data and/or secondary building information. The server 102 securely sends the control command to the BAS 104 over the first communications channel (566). The BAS 104 adjusts an operation parameter of the building systems and/or equipment in accordance with the control command (568).

As will readily be appreciated by a person skilled in the art, the above description with reference to the communication flow diagram shown in FIG. 5 is provided solely as an example and additional or fewer steps, possible uses, etc., are possible without departing from the scope of this disclosure.

Figure 6:
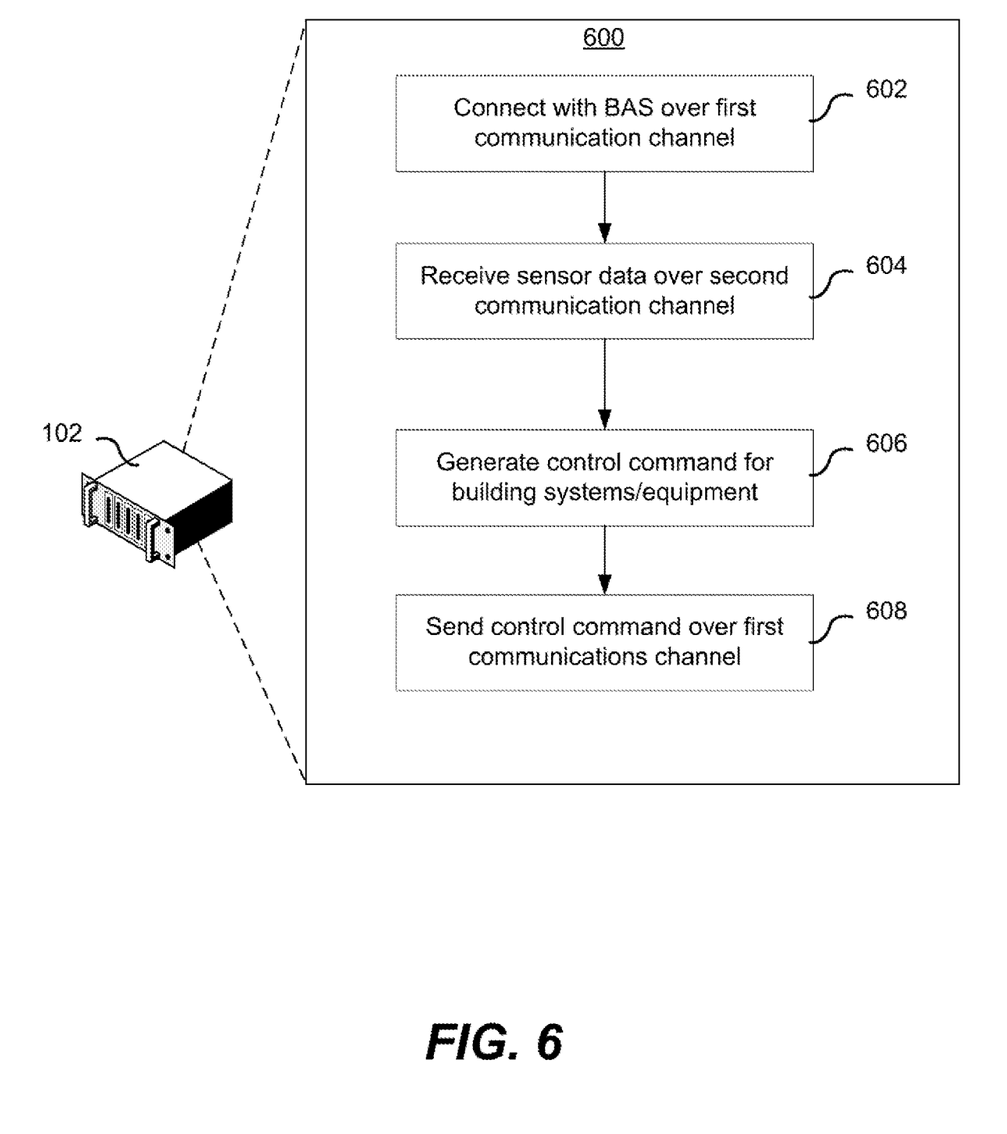
FIG. 6 shows a method performed by the server implementing the smart building agent functionality.

FIG. 6 shows a method performed by the server implementing the smart building agent functionality. More specifically, the processing device may be configured to perform the method 600. A connection is established with the BAS of a building over a first communications channel (602). Sensor data is received over a second communications channel different than the first communication channel (604). The sensor data is received from one or more sensors that are associated with the building but are not connected to the BAS. A control command is generated for the building systems and/or equipment based on the sensor data (606). The control command is sent to the BAS over the first communications channel (608).

It would be appreciated by one of ordinary skill in the art that the system and components shown in FIGS. 1-6 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. A system, comprising:
a Building Automation System (BAS) located within a building, the BAS communicatively coupled to an internal communication network and configured to control building systems and/or equipment;
one or more environmental sensors associated with the building, wherein the one or more environmental sensors are separate from the BAS and do not communicate with the BAS; and
a processing device located remote from the BAS and communicatively coupled to the BAS and the one or more environmental sensors, the processing device configured to communicate with the BAS over a first communications channel, and configured to communicate with the one or more environmental sensors over at least one second communications channel different from the first communications channel for receiving sensor data,
wherein the processing device is configured to generate a control command based on the sensor data received over the at least one second communications channel, the control command providing instructions for the BAS to adjust an operation parameter for one or more of the building systems and/or equipment, and wherein the control command is sent to the BAS over the first communications channel.

2. The system of claim 1, further comprising a network firewall for the building, wherein the BAS is located on an internal network side of the network firewall and the processing device is located on an external network side of the network firewall, and wherein the BAS and processing device communicate over a secure channel passing through the network firewall.

3. The system of claim 2, wherein communication between the one or more environmental sensors and the processing device over the at least one second communications channel passes through the network firewall for the building.

4. The system of claim 1, wherein at least one of the one or more environmental sensors send respective sensor data to a sensor hub associated with the building, and the sensor hub sends the sensor data as an aggregation of the respective sensor data to the processing device.

5. The system of claim 4, wherein the at least one of the one or more environmental sensors send the sensor data to the sensor hub via a wired or wireless connection.

6. The system of claim 5, wherein the wired or wireless connection includes at least a portion of the internal communication network.

7. The system of claim 4, wherein the sensor hub sends the sensor data to the processing device over a cellular network or an IP network.

8. The system of claim 1, wherein at least one of the one or more environmental sensors is configured to communicate over a cellular network, and wherein the at least one second communications channel includes a portion of the cellular network.

9. The system of claim 1, wherein the BAS is further configured to receive building operation data from the building systems and/or equipment via the internal communication network, and to send the building operation data to the processing device via the first communications channel.

10. The system of claim 9, wherein the control command is generated further based on the building operation data.

11. The system of claim 9, wherein the building systems and/or equipment are hard-wired to the BAS.

12. The system of claim 1, wherein the processing device is further configured to communicate with one or more external data sources.

13. The system of claim 1, wherein the communication between the BAS and the processing device over the first communications channel is in accordance with BAS protocols comprising one or more of: BACnet, Modbus, Haystack, oBix, Sedona, and LonWorks.

14. The system of claim 1, wherein the processing device is located in the building.

15. The system of claim 1, wherein the processing device is located in a cloud-based system.

16. The system of claim 1, wherein the processing device is configured to communicate with a plurality of BASs.

17. A method, comprising:
establishing, at a processing device, a connection with a Building Automation System (BAS) over a first communications channel, the BAS located within a building and configured to control building systems and/or equipment, the processing device located remote from the BAS;
receiving, at the processing device, sensor data from one or more environmental sensors over at least one second communications channel, wherein the one or more environmental sensors are associated with the building and are separate from the BAS and do not communicate with the BAS;

generating, at the processing device, a control command based on the sensor data received over the at least one second communications channel, the control command providing instructions for the BAS to adjust an operation parameter for one or more of the building systems and/or equipment; and sending, over the first communications channel, the control command to the BAS.

18. The method of claim 17, further comprising receiving, at the processing device from the BAS over the first communications channel, building operation data from the building systems and/or equipment, and wherein the control command is generated further based on the building operation data.

19. The method of claim 18, wherein the control command is generated by applying pre-defined rules to the received building operation data and sensor data.

20. The method of claim 18, further comprising:
receiving at the processing device, from an external data source, additional data pertaining to the building;
generating a new rule to apply to the building operation data and sensor data based on the additional data; and
generating the control command by applying the new rule to the building data and the sensor data.

\* \* \* \* \*